(12) United States Patent
Hoffmeister et al.

(10) Patent No.: US 7,237,838 B2
(45) Date of Patent: Jul. 3, 2007

(54) ACTIVE HEADREST WITH DECOUPLED LUMBAR FRAME

(75) Inventors: Andreas Hoffmeister, Braunschweig (DE); Bernd Busse, Isenbuettel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 11/247,634

(22) Filed: Oct. 11, 2005

(65) Prior Publication Data

US 2006/0103215 A1 May 18, 2006

(30) Foreign Application Priority Data

Oct. 11, 2004 (DE) .................... 10 2004 050 144

(51) Int. Cl.
*B60N 2/42* (2006.01)
(52) U.S. Cl. .............................. 297/216.12; 297/216.14
(58) Field of Classification Search ........... 297/216.12, 297/216.13, 216.14
See application file for complete search history.

(56) References Cited

U.S. PATENT DOCUMENTS

| | | | |
|---|---|---|---|
| 6,250,714 B1 * | 6/2001 | Nakano et al. | 297/216.12 |
| 6,719,368 B1 * | 4/2004 | Neale | 297/216.14 |
| 6,789,846 B2 * | 9/2004 | Humer et al. | 297/216.12 X |
| 6,955,397 B1 * | 10/2005 | Humer | 297/216.12 X |

FOREIGN PATENT DOCUMENTS

| | | |
|---|---|---|
| DE | 198 50 158 A1 | 5/2000 |
| DE | 101 37 684 A1 | 2/2003 |
| DE | 102 28 675 C1 | 8/2003 |
| WO | WO 98/09838 | 3/1998 |

* cited by examiner

*Primary Examiner*—Anthony D. Barfield
(74) *Attorney, Agent, or Firm*—Christa Hildebrand; Norris McLaughlin & Marcus, PA

(57) ABSTRACT

The invention relates to a headrest arrangement for a backrest section (10) of a motor vehicle seat with a headrest, which receives the headrest bars and is supported in the guides on the side of the backrest, wherein the guides in the backrest can be moved within limits from a normal operating position (68) to a crash-active operating position (70).

Figure 1:
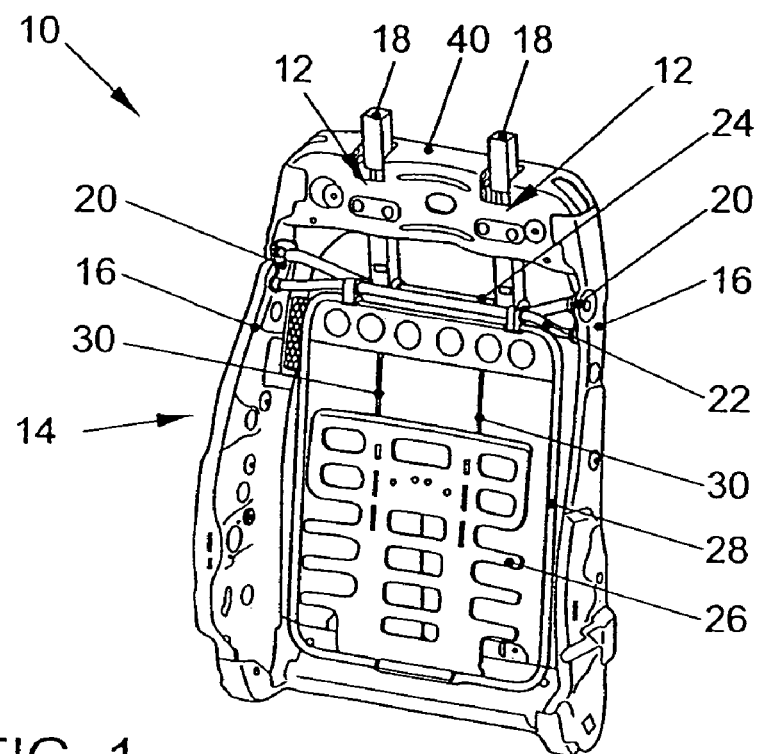

It is provided that for displacing the headrest from the normal operating position (68) relative to the backrest section, an activation unit (11) is provided, which extends essentially along, and at the same height as, a shoulder section of the seated person, wherein an activation shield (38) of the activation unit is displaced rearward in the event of a rear crash—due to the mass inertia of the seated person, whereafter the rearward displacement of the activation shield (38) is transferred via an eccentric shaft (24), causing the guides (18) of a headrest adjustment unit (12) to perform a direct rotational and translational motion so as to attain the crash-active operating position (70).

14 Claims, 3 Drawing Sheets

ACTIVE HEADREST WITH DECOUPLED LUMBAR FRAME

The invention relates to a headrest arrangement for a crash-active headrest with the features recited in the preamble of claim 1.

Among the most frequent injuries sustained by a vehicle occupant in road traffic are neck injuries caused by so-called head whiplash. Such injuries can occur in rear crashes at a relative low speed because of the tremendous pressure exerted on the occupant's neck vertebrae. These injuries occur because, on one hand, the height of the headrest is typically set too low and, on the other hand, the headrest design keeps the headrest too far away from the seat occupant's head. Attempts have been made to neutralize the negative effects from whiplash by developing motor vehicle seats that are equipped with so-called crash-active headrests, or more accurately with headrests that are activated in the event of a rear crash. The inertia of the seat occupant's body exerted in a rear crash on the backrest of the motor vehicle seat is here transferred by corresponding transfer mechanisms to the headrest, pushing the headrest forward.

The aforedescribed types of headrests have therefore not only the purpose to prevent injuries in the event of a frontal crash by cushioning the rearward motion of the seated vehicle occupant's head following an initial forward motion, but also to dampen the rearward motion of the head relative to the vehicle caused by the inertia in a rear crash. Advantageously, the head then contacts the headrest in a rear crash soon after the rear crash impact. The headrest, however, is typically in a normal operating position, and the headrest is often separated from the head by a considerable distance. Without taking additional preventative measures in a rear crash, the head could initially move without restraint and then hit the headrest hard at relatively high speed, which could cause head whiplash.

WO 98/09838 A1 describes a conventional working solution for a crash-active headrest arrangement. The frame of the backrest of the motor vehicle seat has two lateral spaces and a transverse beam connecting an upper region of the lateral spaces. Sleeve-like support members, which receive the support bars of the headrest for providing a height adjustment, are guided on the transverse beam for axial and pivotal movement. The lower ends of the support members are rigidly connected with a headrest support frame, which is arranged between the side rails of the backrest frame and is bent into a U-shape and open toward the bottom. The lower end regions of the two legs of the headrest support frame are guided by connecting bars on the adjacent side rails of the backrest frame. An impact plate also extends in this region between the two legs of the headrest support frame. If the seat occupant's body pushes the impact plate forcefully rearward following a rear crash, then the lower region of the entire headrest support frame pivots to the rear and upward, moving the support members of the headrest on the transverse beam of the backrest frame upward and pivoting their upper section forward. This mechanism causes the headrest in a rear crash to move forward and upward. Disadvantageously, the seat occupant essentially exerts an impact force on the impact means, and hence also on the headrest support construction which is directly connected to the impact means, in a horizontal and potentially downward direction. However, the essentially horizontal impact force must produce a vertical force component to move the headrest in the desired upward direction by a distance which should be significantly greater than the forward displacement. This is accomplished by employing in the impact means connecting bar guides or equivalent linkage members. However, such design has certain limitations.

Another solution is disclosed in DE 180 50 758 A1. This published patent application describes a headrest arrangement for a backrest of a vehicle seat wherein the headrest is supported in the backrest in guides. The guides in the backrest are mounted in the backrest so as to allow a limited pivoting motion about a common transverse pivot axis. A pressure plate is arranged in the backrest which makes contact over the entire back region of the seated occupant and introduces a pivoting motion for initiating a forward displacement of the headrest. The interlock of the upper end of the pressure plate, which is located close to the guides, is released following a rear crash and is displaced rearward by the inertia of the seated person. The rearward displacement is transferred to the pivotally supported guides. The impact means is here also a pressure plate, which can likewise be implemented as a lumbar shield.

It is an object of the invention to provide, based on these principles, an improved headrest arrangement, which in the event of a rear crash promotes a direct and rapid contact between the head of a vehicle occupant and the headrest.

The object is solved by the invention by a headrest arrangement with the features recited in claim 1. An activation unit is provided, which has an activation shield and extends essentially along and at the same height of a shoulder section of the seated person. The activation unit displaces in a rear crash—due to the mass inertia of the seated person—the headrest rearward from the normal operating position relative to the backrest section. The rearward displacement of the activation shield is transferred to an eccentric shaft which directly moves the guides of a headrest adjustment unit in a rotational and translational fashion to attain a crash-active operating position. The forces applied to the activation shield of the activation unit then have force vectors with horizontal force components and upwardly directed vertical force components, which directly activate the headrest via the headrest adjustment unit without play and with a high degree of firmness.

According to an advantageous embodiment of the invention, the activation shield of the activation unit is constructed so as to extend over the entire shoulder width of the seated person. According to another embodiment, an installed lumbar shield is suspended by a lumbar wire below the activation unit on the activation shield. The lumbar shield remains decoupled at a decoupling site in the normal operating position as well as in the crash-active operating position of the head rest arrangement.

According to another advantageous embodiment, the activation shield is suspended on a respective second hinge point in lever end plates, which are each secured to the sides of respective side rails of the backrest section. Both sides of the eccentric shaft are supported in a first attachment point in the lever end plates. The lever end plates are secured for rotation in a second attachment point on the side rails of the backrest section.

To support and/or ensure that the active headrest returns from the crash-active operating position to the normal operating position, the lever end plates include a first attachment point, in which a return spring which is secured to the respective side rails can be attached with a predetermined pretension.

The activation shield and the eccentric shaft disposed between the lever end plates as well as the return spring represent the activation unit of the headrest arrangement of the invention. The activation unit operates on the headrest adjustment unit which is connected according to the invention with the activation unit by connecting means, preferably bushings arranged on the eccentric shaft. The bushings encompass the eccentric shaft, so that the motion of the eccentric shaft of the activation unit can be reliably transferred to the headrest adjustment unit.

According to a advantageous embodiment, the headrest adjustment unit is arranged in a head plate of the backrest section. The headrest adjustment unit forms a support bracket, which is supported in the head plate on both sides (top and bottom) by support bracket support elements. The guides of the headrest adjustment unit extend through the head plate, with sleeve-like guide elements, in which the guides of the headrest can move axially, being arranged in the support bracket. In addition, the guides members forming a sleeve form a pivot point in the support bracket, enabling the guides of the headrest to rotate relative to the backrest in the head plate of the backrest section.

With this arrangement and the movement of the eccentric shaft, the horizontal and slightly upward vertical motion of the activation shield enables the guides of the headrest adjustment unit to move in a linear direction and to also rotate.

In another advantageous embodiment of the invention, the compact and slender construction and placement of the headrest adjustment unit below the foam section of the motor vehicle seat ensures that the headrest adjustment unit forms in both the normal operating position and in the crash-active operating position an intermediate space or gap with a foam section of the motor vehicle seat, so as to prevent friction with the foam section and to reduce friction losses.

Other advantageous embodiments of the invention are recited as additional features in the dependent claims.

Figure 2:
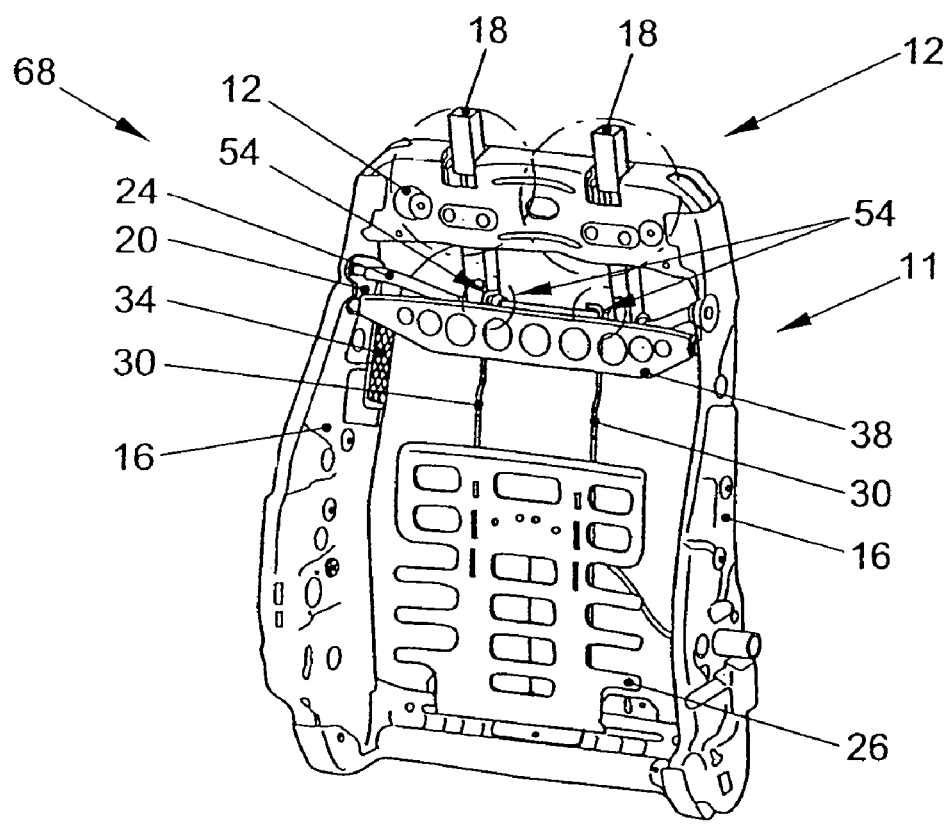
Figure 3:
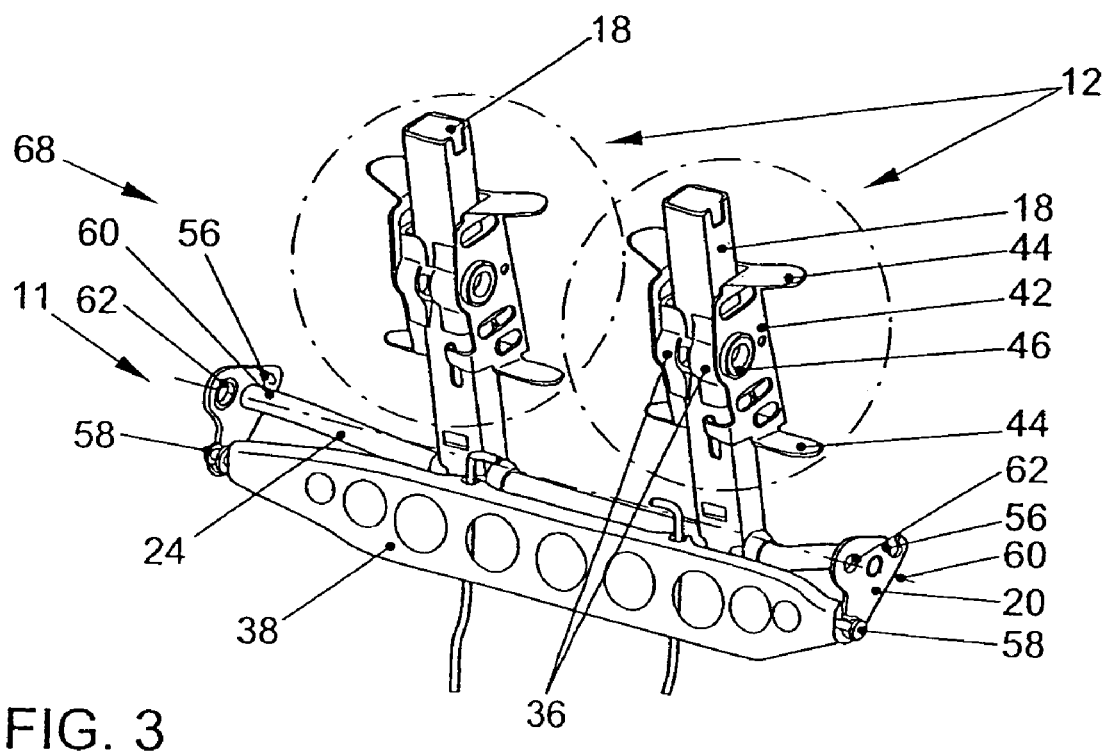
Figure 4:
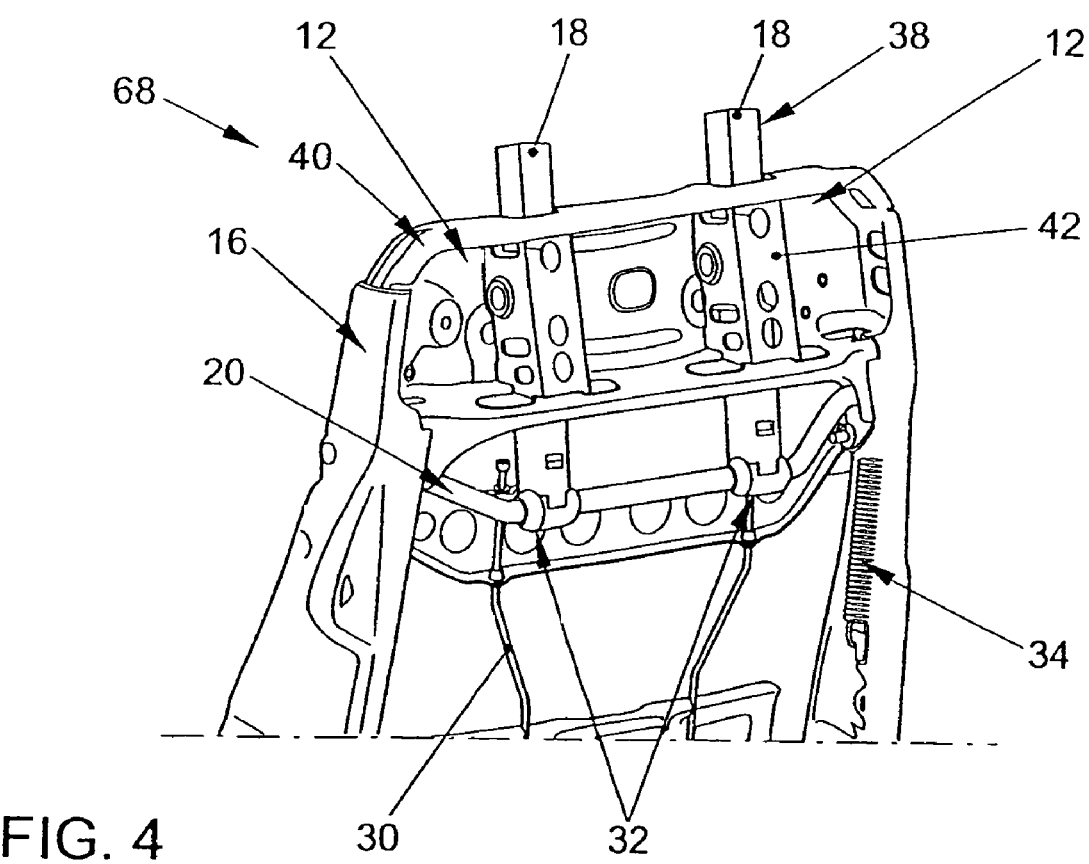
Figure 5:
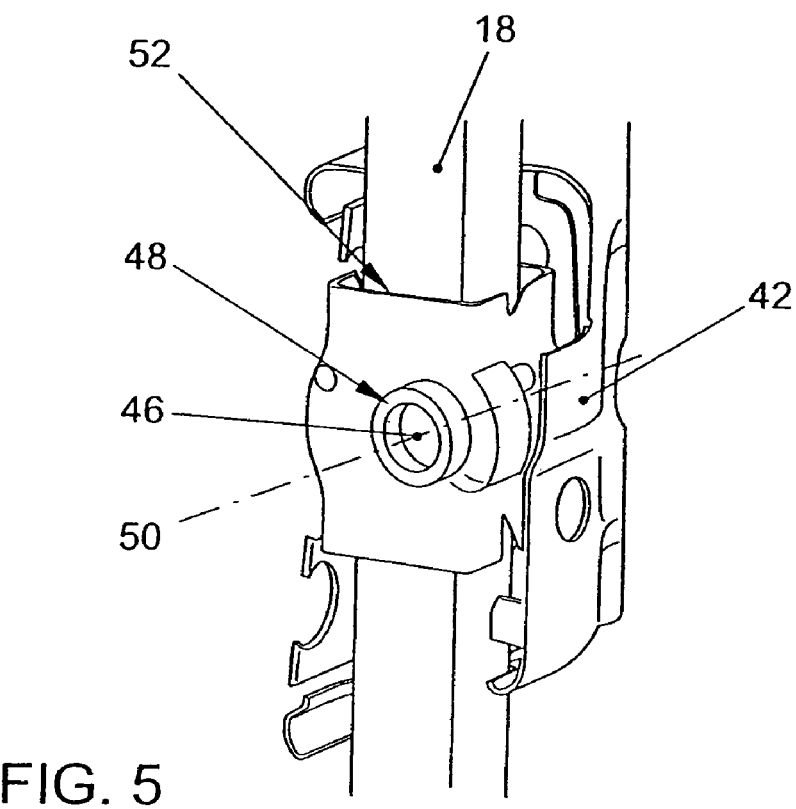
Figure 6:
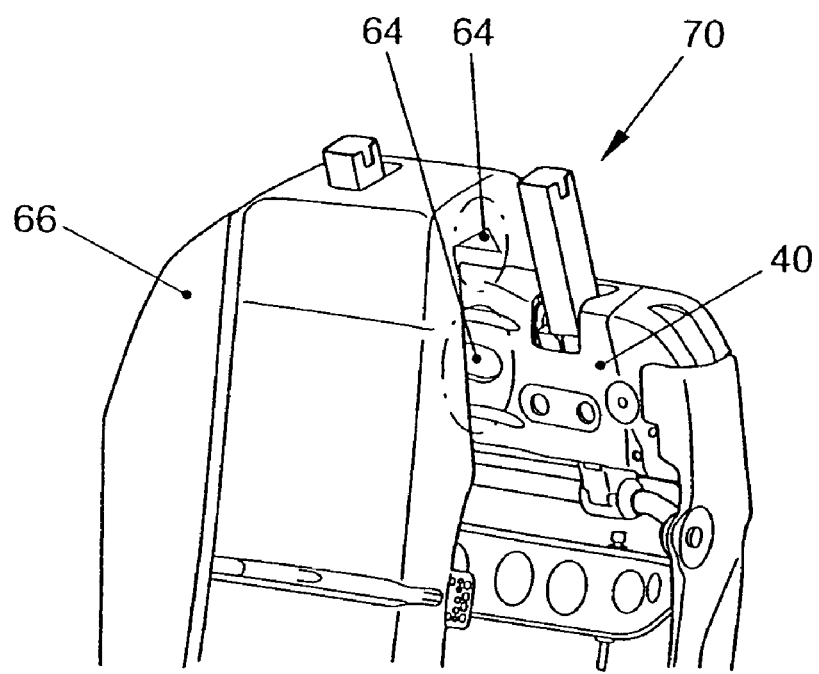

An exemplary embodiment of the invention will now be described in detail below with reference to the drawings. It is shown in:

FIG. 1 a perspective front view of a headrest arrangement with a headrest adjustment unit and a conventional activation unit, a lumbar shield connected to the headrest adjustment unit;

FIG. 2 a perspective front view of the headrest arrangement of the invention with a headrest adjustment unit and an activation unit with an activation shield, which is decoupled from the lumbar shield and directly connected with the headrest adjustment unit;

FIG. 3 a perspective front view of the essential components of the headrest adjustment unit and the activation unit;

FIG. 4 a perspective rear view of the headrest adjustment unit and the activation unit inside the backrest subframe, and of the head plate;

FIG. 5 a detailed diagram of the components of the headrest adjustment unit; and FIG. 6 a perspective view of the headrest unit and the activation unit in relation to the seat foam of the backrest section.

FIG. 1 shows a perspective front view of a backrest section 10 with a headrest adjustment unit 12 according to the invention and an activation unit 11 with an operating lever 22. A lumbar shield 26 forming a pressure plate for actuating an active headrest is disposed on the backrest section 10. The backrest section 10 has a backrest subframe 14 which is essentially made of side rails 16 and a head plate 40. The lumbar shield 26 is suspended by two vertical lumbar wires 30 in a lumbar frame 28. The lumbar frame 28 operates on an eccentric shaft 24 via the operating lever 22 and lever end plates 20 arranged in the side rails 16. The eccentric shaft 24 operates on the guides 18 of the headrest adjustment unit 12 of the invention. The eccentric shaft 24 has an innovative design and will be described in more detail below.

In the conventional solution which employs the suspended coupled lumbar shield 26 as a pressure plate, the forces acting on the lumbar shield 26 disadvantageously cause the lumbar shield 26—due to its flexibility—to be displaced in a horizontal direction, or slightly downwardly in an almost horizontal direction, in the event of a rear crash. This displacement delays activation of the active headrest.

FIG. 2 shows, based on FIG. 1, a perspective front view of the headrest adjustment unit 12 and the activation unit 11 with an activation shield 38 which is decoupled from the lumbar shield 26 and is instead directly connected with the headrest adjustment unit 12. In FIG. 2 and the following Figures, identical components are identified by identical reference symbols.

As shown in FIG. 2, the activation shield 38 of the activation unit 11 inside the side rails 12 extends over the entire width of the shoulder section of a person seated on the motor vehicle seat. Unlike in the conventional devices depicted in FIG. 1, a decoupling location 54 is provided, although the lumbar shield 26 is still suspended in the activation shield 38 by lumbar wires 30. Decoupling the lumbar shield 26 from the activation shield 38 is accomplished by extending the lumbar wires 30 going through the activation shield 38. The lumbar wires 30 are bent over above the activation shield 38 and secured. The lumbar shield 26 is thereby decoupled from the activation shield 38 both in a normal operating position 68 of the activation unit 11 as well as in a crash-active operating position 70 of the activation unit 11.

In the event of a rear crash, the motion of the substantially horizontal and slightly upward vertical motion of the activation shield 38 is transferred to the eccentric shaft 24, which ensures that the activation unit 11 moves the headrest adjustment unit 12 from the normal operating position 38 to the crash-active operating position 70 and back. This is accomplished by placing the activation shield 38 in the lever end plates 20.

FIG. 3 shows in a detailed perspective front view the essential components of the headrest adjustment unit 12 and the activation unit 11.

The lever end plate 20 includes two suspension points 56, 58, which are each implemented on both sides of each lever end plate. The first suspension point 56 is provided for suspending the upper end of a return spring 34, whereas the second suspension point 58 is provided for suspending the activation shield 38. In addition, the lever end plates 20 each have attachment points 60 and 62. The first attachment point 60 receives the eccentric shaft 24 in the lever end plate 20, while the second attachment point 62 is provided so that the lever end plates can rotate in the side rails 16. This arrangement of the lever end plates 20, which operate as levers and are arranged in the side rails for rotation about an axis (dotted line), transfers movement of the activation shield 38 to the eccentric shaft 24. Preferably, a respective bushing 32 which surrounds the eccentric shaft 24 forms a connecting member between the activation unit 11 and the headrest adjustment unit 12. FIG. 4 shows a rear perspective view of the backrest subframe 14 and the headrest adjustment unit and the activation unit 11, 12. The bushings 32 surrounding the eccentric shaft 24 transfer the motion of the activation unit 38 to the guides of the headrest adjustment unit 12.

FIG. 3 and FIG. 4 show in a front and rear view, respectively, details of the headrest adjustment unit 12. As seen in FIG. 4, the guides 18 extend through the retraction channels of the head plate 40 of the backrest subframe 14. A respective support bracket 42, which is supported on the retraction channels at the top and the bottom in the head plate 40 by support bracket support elements 44, is provided for placing and positioning the guides 18. At least one additional guide member 36 is arranged inside the support bracket 42. These guide members 36 transfer the translatory and rotational motion of the guides 18 produced by the eccentric shaft 24. The guide members 36, which in a preferred embodiment are each made in two parts, include bearings formed in the side of the support bracket 42, which form a pivot point in openings below the support bracket 42.

The arrangement according to FIG. 5 shows again a perspective diagram of the guide members 36 in the respective support bracket 42, which form a sleeve, this time without the support bracket 42 and the head plate 40. The guides 18 are encompassed by the two-part guide members 36 and form translation guide surfaces 62 between the guide member is 36 and the guides 18, and/or a rotation guide surfaces 62 within the bearing 48.

According to FIGS. 2 to 4, the activation unit and the headrest adjustment unit 11, 12 are initially in a normal operating position 68. In the event of a crash, in particular a rear crash, the occupant is thrust against the activation shield 38 due to mass inertia. This displacement of the activation shield 38 is transferred via the lever end plates 20 to the eccentric shaft 24, whereby the lumbar shield 26 remains decoupled as a result of the implemented decoupling locations 54. The eccentric shaft 24 performs in part a translatory, but also a rotational motion, which is transferred to the guides 18.

This translatory and rotational motion can be transferred by the guides 18 by way of the aforedescribed arrangements to the guide members 36, which enable rotation and translation. The guide members 36 are positioned by the installed support bracket 42. Placing headrest bars in the guides 18 enables the headrest to move directly and quickly to a crash-active operating position. The return spring, which is attached with one end in the lever end plates 20 of the first suspension point 56 and with the other end in the side rails 16, is tensioned when moving from the normal operating position 68 to the crash-active operating position 70. Relieving the spring tension supports or implements the return motion from the crash-active operating position 70 to the normal operating position 68. The headrest arrangement can therefore be used several times without any problem.

The space-saving configuration of the headrest adjustment unit 12 also guarantees that an intermediate space or a gap 64 remains between the headrest adjustment unit 12, in particular the head plate 40, and a seat foam section 66 of the motor vehicle seat both in the normal operating position 68 and in the crash-active operating position 70, as shown in FIG. 6. The exposed areas in the crash-active operating position 70 are indicated in FIG. 6 by a dotted line.

LIST OF REFERENCE SYMBOLS 10 backrest section
11 activation unit
12 headrest adjustment unit
14 backrest subframe
16 side rails
18 guides (headrest tube)
20 lever end plates
22 operating lever
24 eccentric shaft (transfer lever)
26 lumbar shield
28 lumbar frame
30 lumbar wire
32 bushing
34 return spring
36 guide members
38 activation shield
40 head plate
42 support bracket
44 bracket support elements
46 pivot point
48 bearing
50 rotation guide surfaces
52 translation guide surfaces
54 decoupling location
56 first suspension point return spring 34
58 second suspension point activation shield 38
60 first attachment point eccentric shaft 24
62 second attachment point side rail 16
64 intermediate space, gap
66 foam section
68 normal operating position
70 crash-active operating position

The invention claimed is:

1. Headrest arrangement for a backrest section (10) of a motor vehicle seat with a headrest, the headrest arrangement being moveable from a normal seating position (68) to a crash-active position (70), the headrest arrangement comprising
an activation unit (11) and a headrest adjustment unit (12),
the activation unit (11) comprises an activation shield (38) and an eccentric shaft (60),
the activation shield (38) has a first and a second end and the eccentric shaft 60 has a first and a second end,
the first end of the activation shield and the first end of the eccentric shaft are attached to a first lever end plate,
the second end of the activation shield and the second end of the eccentric shaft are attached to a second lever end plate,
the head rest adjustment unit (12) comprises two head rest guides (18) supported on the eccentric shaft,
wherein the activation unit (11) extends essentially along, and at the same height as a shoulder section of a seated person, and
wherein the headrest is moveable from the normal seating position (68) relative to the backrest section in that the activation shield (38) is displaced rearwardly in the event of a rear crash, and
wherein the rearward displacement of the activation shield (38) is transferred via the eccentric shaft (24), causing the head rest guides (18) to perform a direct rotational and translational motion so as to attain the crash-active operating position (70).

2. Headrest arrangement according to claim 1, wherein the activation shield (38) of the activation unit (11) is implemented so as to extend over the entire width of the shoulder section of the seated person.

3. Headrest arrangement according to claim 1, wherein in the event a lumbar shield (26) is suspended in the activation shield (38) at a decoupling location (54) and decoupled by way of a lumbar wire (30).

4. Headrest arrangement according to claim 1, wherein the attachment of the first end of the activation shield (38) is executed by suspending-the first and second lever end plates (20) at a hinge point (58).

5. Headrest arrangement according to claim 4, wherein the first and second lever end plates (20) includes a first and second attachment point (62) for rotational attachment to a side rails (16) of the backrest section (10).

6. Headrest arrangement according to claim 5, wherein the first and second lever end plates (20) include an attachment point (60) for attaching a first end of a return spring (34), a second end is secured to the side rails (16).

7. Headrest arrangement according to claim 1, wherein the activation unit (11) and the headrest adjustment unit (12) are connected by a bushing (32) which surrounds the eccentric shaft (24).

8. Headrest arrangement according to claim 1, wherein the headrest adjustment unit (11) is arranged in a head plate (40) of the backrest section (10).

9. Headrest arrangement according to claim 1, wherein the headrest adjustment unit includes a support bracket (42), which is disposed on both sides in the head plate (40) by bracket support elements (44).

10. Headrest arrangement according to claim 1, wherein the head rest guides (18) extend through the head plate (40) and that sleeve-like guide elements (36) are arranged in the support bracket (42), with the guides (18) translationally movable in the guide elements (36).

11. Headrest arrangement according to claim 10, wherein separate rotation guide surfaces (50) and/or translation guide surfaces (52) are formed in the guide elements (36) for the translational and rotational movement of the guides (18).

12. Headrest arrangement according to claim 1, wherein the guides (18) extend through the head plate (40) and the sleeve-like guide elements (36) are ranged in the support bracket (42) which form a rotation point (46) in the support bracket (42), whereby the head rest guides (18) are arranged for rotation in the head plate (40).

13. Headrest arrangement according to claim 1, wherein the head rest guides (18) are implemented as a headrest tube or and a headrest profile or the like, and that the guides (18) can be inserted into the guide elements (36) by a friction connection.

14. Headrest arrangement according to claim 1, wherein the headrest adjustment unit (12) includes in both the normal operating position and in the crash-active operating position an intermediate space (64) relative to a foam section (66) of the motor vehicle seat, so as to prevent friction with the foam section and friction losses.

* * * * *

UNITED STATES PATENT AND TRADEMARK OFFICE
CERTIFICATE OF CORRECTION

PATENT NO.        : 7,237,838 B2
APPLICATION NO.   : 11/247634
DATED             : July 3, 2007
INVENTOR(S)       : Hoffmeister et al.

It is certified that error appears in the above-identified patent and that said Letters Patent is hereby corrected as shown below:

Column 7, Line 2, "end plates (20)" should read -- end plate (20) --

Column 8, Line 7, "are ranged" should read -- are arranged --

Signed and Sealed this

Twenty-third Day of October, 2007

JON W. DUDAS
*Director of the United States Patent and Trademark Office*